United States Patent [19]

D'Aluisio et al.

[11] Patent Number: 5,555,775
[45] Date of Patent: Sep. 17, 1996

[54] BICYCLE HANDLEBARS

[75] Inventors: Christopher D'Aluisio, Bethel; Thomas C. Patterson, Westport, both of Conn.

[73] Assignee: Cannondale Corporation, Georgetown, Conn.

[21] Appl. No.: 302,545

[22] Filed: Sep. 8, 1994

[51] Int. Cl.$^6$ ............................................. B62K 21/16
[52] U.S. Cl. ........................................ 74/551.5; 74/551.3
[58] Field of Search ........................... 74/551.3, 551.4, 74/551.5, 551.7

[56] References Cited

U.S. PATENT DOCUMENTS

| | | | |
|---|---|---|---|
| 3,863,521 | 2/1975 | Gatsos et al. | 74/551.4 |
| 4,023,436 | 5/1977 | Dodge | 74/551.3 |
| 4,361,057 | 11/1982 | Kochera | 74/551.4 |
| 4,682,509 | 7/1987 | Takamiya et al. | 74/551.4 |
| 5,163,339 | 11/1992 | Girad, Jr. et al. | 74/551.3 |
| 5,275,067 | 1/1994 | Lew | 74/551.3 X |

*Primary Examiner*—Charles A. Marmor
*Assistant Examiner*—MaryAnn Battista

*Attorney, Agent, or Firm*—Brumbaugh, Graves, Donohue & Raymond

[57] ABSTRACT

Adjustable bicycle handlebars comprise a mounting member adapted to be attached to a bicycle frame and right and left handlebars that are mounted on the mounting member to swing between standard positions in which they extend generally downwardly and laterally outwardly in opposite directions from the mounting member and aero positions in which they extend generally forwardly from the mounting member in closely adjacent relation. The handlebars are interconnected for coordinated swinging movement between the standard and aero positions so that when either of them is moved between the positions the other moves with it. Each handlebar has an armrest portion adapted to support a portion of the forearm of a rider when the handlebar is in the aero position. Also, each handlebar has an elongated body portion adjacent the mounting member and a handgrip portion remote from the mounting member that extends generally vertically when the handlebar is in the aero position. A brake lever is mounted on each handlebar immediately adjacent the handgrip portion so that it is immediately accessible to the rider in both the standard and aero positions of the handlebars.

14 Claims, 8 Drawing Sheets

BICYCLE HANDLEBARS

BACKGROUND OF THE INVENTION

Bicycles have evolved over many decades into highly efficient machines. They are strong, stiff, and amazingly light in weight. They are not, however, aerodynamically efficient.

Athletes have turned towards aerodynamics with the hope that a more aerodynamic bicycle or position will make them go faster and reduce time in a race. New wheel designs have attempted to reduce the drag created by the rotating wheels. The common spoked wheels, when rotating at any speed, act as turbines and provide a great amount of drag. Several designers have reduced the number of spokes and/or installed the spokes radially. This has somewhat reduced the turbine air-pumping effect. Others have turned towards disc wheels, aero rims, or composite aero wheels. These changes, however, only reduce the drag created by the wheels and do not contribute towards reducing the drag created by the rider, one of the major sources of drag.

Some designers have attempted to decrease the drag created by the rider by providing aero handlebars, or "aero bars." Aero bars became popular after Greg LeMond won the Tour de France in 1989 and 1990 while using them. Aero bars stretch out the rider by forcing the rider to ride with his or her back almost horizontal and arms extended forward. This reduces the frontal area and helps the rider "slice" through the air. Additionally, because the aero bars stretch out the rider and the rider's back is flattened, drag due to the suction created behind the rider is reduced, again because of the lower effective area presented to the suction.

One drawback of the modern aero position is poor leverage and control for climbing or sprinting, particularly if the rider rides out of the saddle. Furthermore, because the braking controls are not integrated within the aero bars, they are not immediately accessible to the rider and are also out in the airstream and add drag. The usual arrangement of a bicycle equipped with standard handle bars and clip on aero bars is, accordingly, not ideal.

SUMMARY OF THE INVENTION

An object of the present invention is to provide handlebars that allow the rider to ride both out of the saddle for starting, sprinting and climbing and to ride in the aero position at all other times. Another object is to have the brake levers accessible to the rider's hands in both riding positions. Yet a further object is to improve the aerodynamics of a bicycle ridden in the aero position by not having standard handle bars extending out into the air flow.

There is provided, in accordance with the present invention, adjustable bicycle handlebars comprising a mounting member adapted to be attached to a bicycle frame and right and left handlebars that are mounted on the mounting member to swing between standard positions in which they extend generally downwardly and laterally outwardly in opposite directions from the mounting member and aero positions in which they extend generally forwardly from the mounting member in closely adjacent relation. Preferably, the right and left handlebars are interconnected for coordinated swinging movement between the standard and aero positions so that when either of them is moved between the positions the other moves with it.

In preferred embodiments, each handlebar has an armrest portion adapted to support a portion of the forearm of a rider when the handlebar is in the aero position. Also, each handlebar has an elongated body portion adjacent the mounting member and a handgrip portion remote from the mounting member that extends generally vertically when the handlebar is in the aero position. A brake lever is mounted on each handlebar immediately adjacent the handgrip portion so that it is immediately accessible to the rider in both the standard and aero riding positions.

In embodiments of the handlebars of the present invention that are particularly adapted for a bicycle having a wheeled truck with individually steerable wheels, each handlebar includes a support member and a joystick mounted for pivotal movement on the support member, and the mounting member is affixed to the frame. In both the standard and aero positions of the handlebars, the support member is stationary, and the wheels are steered by rocking the joysticks from side to side. As in the preferred form of handlebars for bicycles with conventional front wheels in which the handgrips extend vertically, the joysticks are arranged on the support members so that they extend generally vertically when the handlebars are in the aero position.

When the handlebars of the present invention are used on a bicycle having a conventional single steerable front wheel assembly, the mounting member is attached to the steering tube and each handle bar has an arm portion and a handgrip portion affixed to the arm portion and extending generally vertically when the handlebar is in the aero position. The handlebars can be retrofit to existing bicycles.

The present invention eliminates the need for redundant components, namely, standard handlebars and aero bars, and combines them into one. The rider can instantly change from one mode to the other. In either mode, there are no redundant bars to add drag. In both modes, the brakes are immediately at hand.

For a better understanding of the invention, reference may be made to the following description of an exemplary embodiment, taken in conjunction with the accompanying drawings.

DESCRIPTION OF THE EMBODIMENT

The bicycle shown in FIGS. 1 to 5 is of a highly innovative, revolutionary design and is intended for time trial racing. The frame 10 is a wide-body monocoque that is, preferably, made of a fiber-resin composite material. It has an overall width of about eight inches and includes, in profile, a generally C-shaped front portion 12 and a generally S-shaped rear portion 14, the portions 12 and 14 being of about the same overall width. The front and rear portions are joined by a relatively slender top portion 16 and a relatively slender bottom portion 18.

The frame 10 is designed to manage the air flow in a manner such as to minimize the generation of turbulence. In conventional tube frames, the air flow past the frame is repeatedly subjected to diversion by the fronts of the members and the formations of highly turbulent eddies in the wakes of the members. The frame of the bicycle of FIGS. 1 to 5 provides, predominantly, a single diversion of the air flow along the wide front portion 12 and a collapse or recombining of flow streams, predominantly, only at the wide rear portion. In addition, the lateral diversion of the air by the front portion of the frame throws a large amount of the air away from the lower body and legs of the rider. The combination of reducing the myriad eddies in the wakes of members and components (and the lower part of the body the rider) and diverting air away to the sides of the rider reduces drag and, all other things being equal, increases speed.

The primary surfaces involved in managing the air flow are the front-facing surface of the front portion 12 and the rear-facing surface of the rear portion. The front-facing surface 12*ff* has a slightly rounded frontmost edge 12*fe* at the longitudinal center plane and smooth diverging side portions 12*sp*. The side portions deflect the air flow laterally so that a large part of it flows to either side of the rider. The diverted air flow streams on opposite sides of the bicycle and rider are largely kept from recombining until they are in back of the rider and the rear portion 14. The formation of high turbulence behind the frame is minimized by a transversely and laterally convexly curved rear-facing surface 14*rf*, which allows the diverted flow streams to recombine along long controlled flow paths in the wake of the frame. The widebody frame is the subject of concurrently-filed U.S. patent application Ser. No. 08/302,367, which is hereby incorporated by reference.

Figure 1:
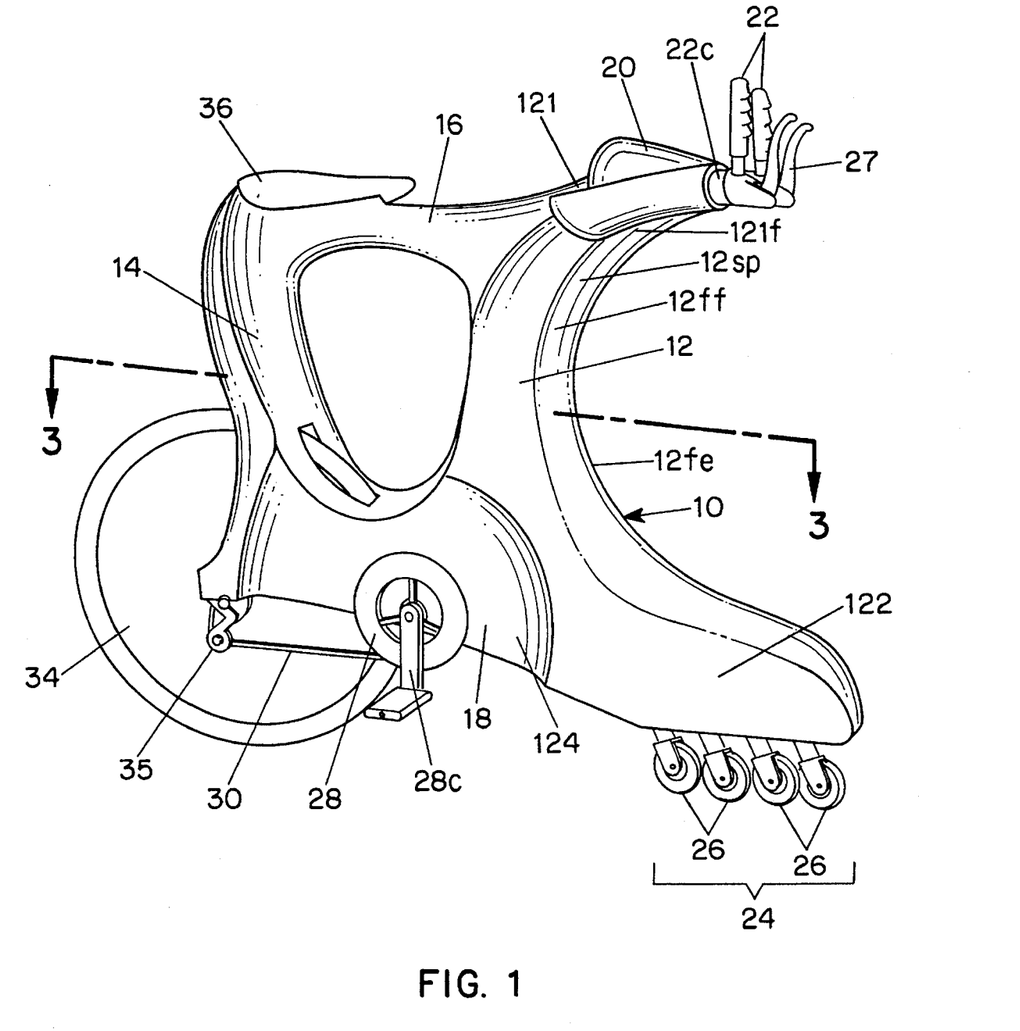
FIG. 1 is a pictorial view of a bicycle equipped with a small-wheel truck as its front "wheel"
Figure 2:
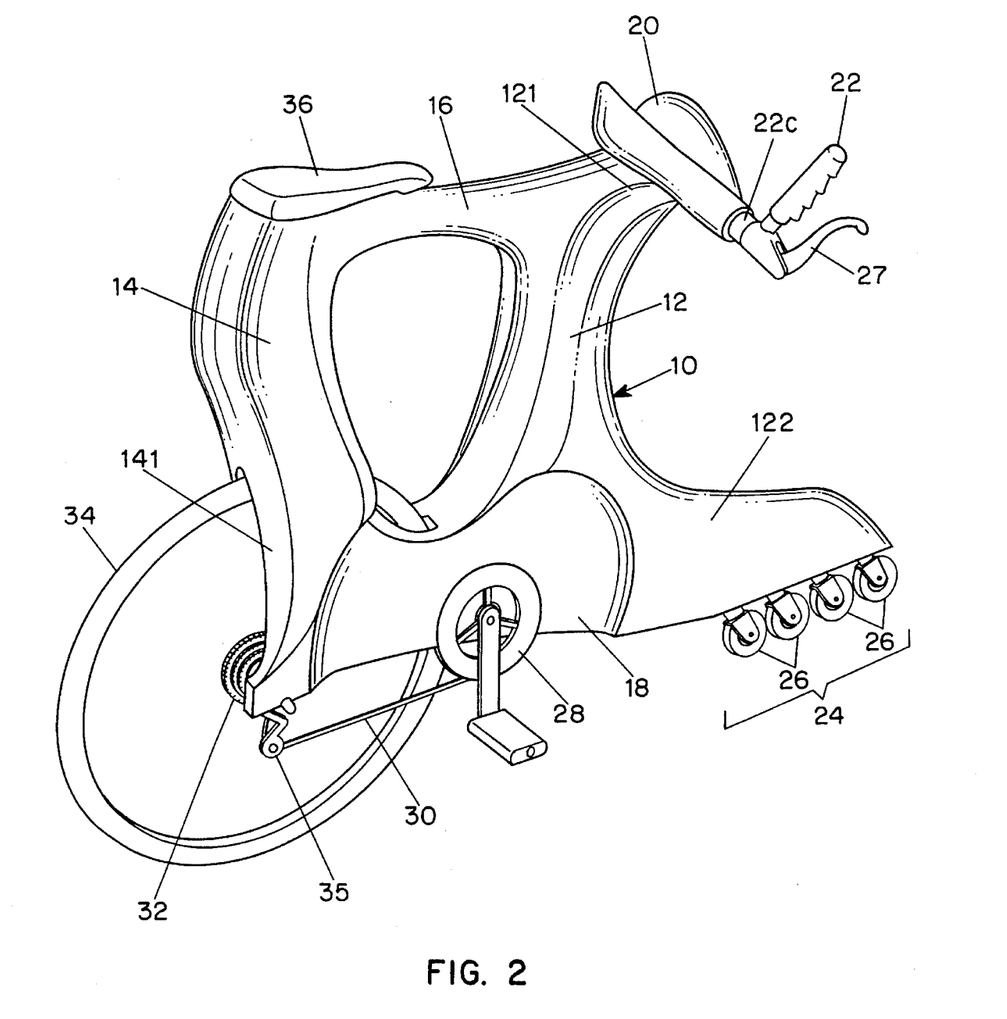
FIG. 2 is another pictorial view of the bicycle of FIG. 1.

The bicycle of FIGS. 1 and 2 has handlebars 20, according to the present invention, that are mounted on the upper end 121 of the front portion 12 of the frame and, accordingly, are mounted on the frame and are linked to each other in a manner such they can be swung at will by the rider between an "aero" position (FIGS. 1 and 4), in which they extend forwardly and lie closely together to allow the rider to assume the "aero" riding position and a "standard" position (FIGS. 2 and 5), in which they extend downwardly and outwardly and allow the rider to assume a starting and hard-pumping position out of the saddle. The handlebars 20, apart from the movements involved in adjusting them between the aero and standard positions, do not move. The bicycle is instead steered by linked steering handles or "joysticks" 22 on the end of each handlebar 20 that rock from side to side in tandem in a tiller-like manner. The joysticks are coupled to the front "wheel" of the bicycle, which is a small-wheel truck 24 that is received in a forwardly extending boot part 122 of the front portion of the frame. The truck frame is stationary; each of the wheels 26 of the truck 24 is resiliently mounted, individually steered, and individually braked. The small-wheel truck is the subject of concurrently-filed U.S. patent application Ser. No. 08/302,535, which is hereby incorporated by reference.

A chain crankset 28 is rotatably mounted on the lower portion 18 of the frame, the sprocket wheels being recessed into the lower portion 18 in a recess 124. The recess 124 in the wall of the lower portion 18 allows the crank arm 28*a* to rotate with a small clearance while the side wall portions of the frame around the recess 124 aerodynamically shield the crank from the air flow along the sides of the frame. The upper run of a chain 30 extends from the crankset 28 through a tunnel (not visible) in the frame to a sprocket cassette 32 coupled to the rear wheel 34, which may be any conventional wheel such as the disc wheel shown in FIGS. 1 and 2. The lower part of the rear portion 14 of the frame is bifurcated to receive the wheel 34 and cassette 32 between rear leg parts 141 that straddle the rear wheel. The lower run of the chain returns below the frame from a derailleur 35. A saddle 36 is supported on the upper end of the frame rear portion 14.

Figure 3:
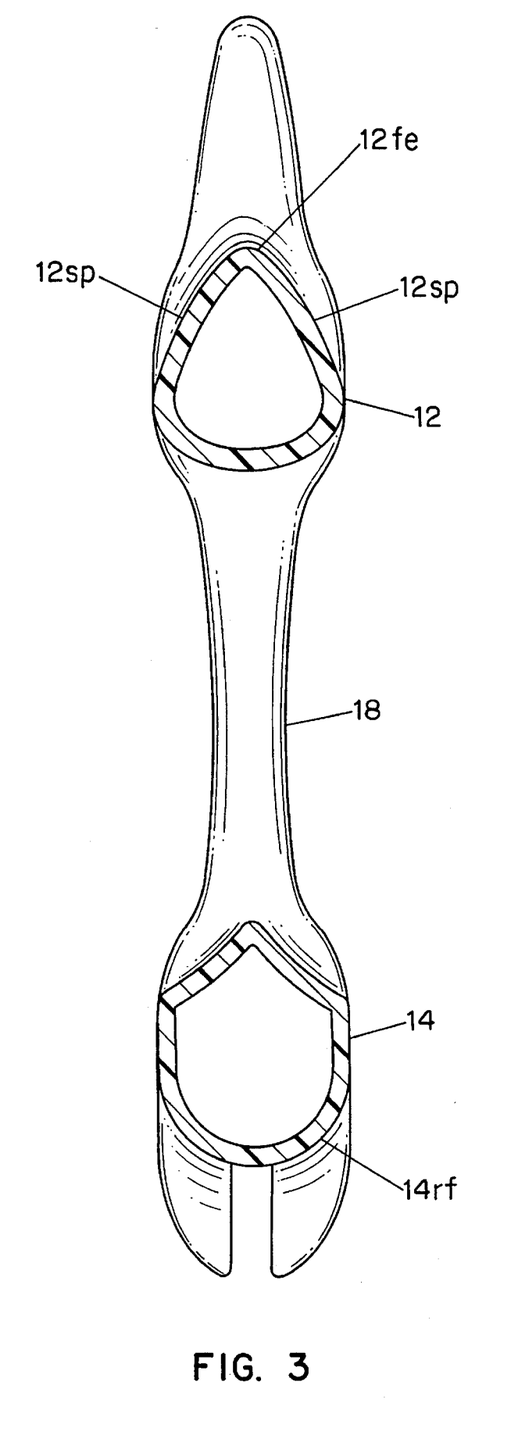
FIG. 3 is a top cross-sectional view of the frame of the bicycle of FIGS. 1 and 2 taken generally along the lines 3—3 of FIG. 1.
Figure 4:
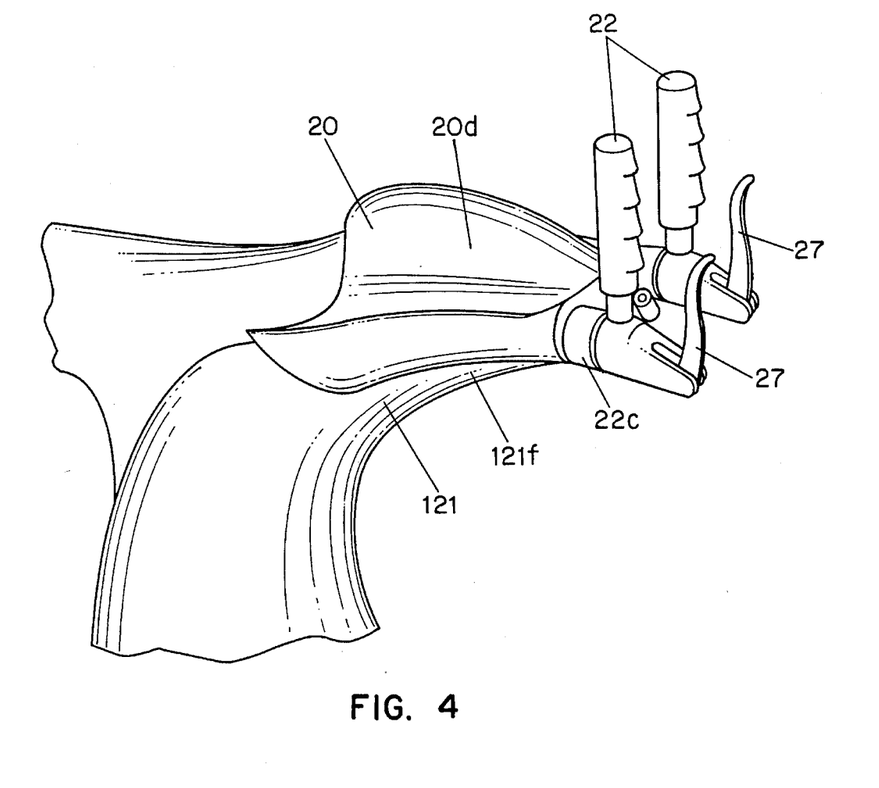
FIG. 4 is a detail pictorial view of the upper end part of a front portion of the frame of the bicycle of FIGS. 1 to 3 and shows the handle bars in their "aero" position.
Figure 5:
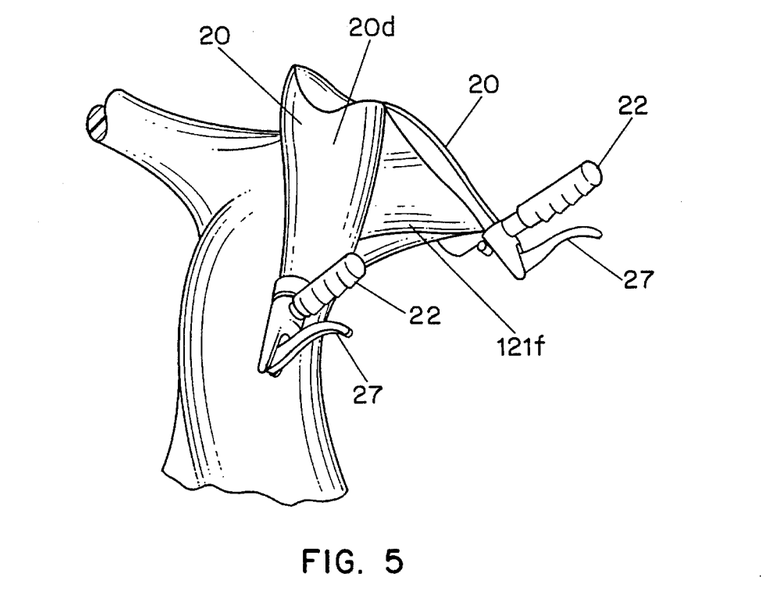
FIG. 5 is another detail pictorial view of the upper end part of a front portion of the frame and shows the handle bars in their "standard" position.

The upper end 121 of the front portion 12 of the frame 10 curves forwardly and is tapered to a relatively sharp, front-facing nose (see FIGS. 3 and 4). The upper aspect of the upper end 121 has a downwardly and outwardly sloping dome-like face 121*f* on each side of the longitudinal center plane, the faces 121*f* being symmetrical about the center plane. Each face is closely spaced from a matching face (not visible) on the underside of the handlebar. Each handlebar is mounted on a pivot shaft carried by the frame and oriented perpendicularly to the face 121*f*. As described below in more detail, the pivot shafts of the two handlebars are coupled by a universal joint so that rotation of each handlebar between the standard and aero positions is matched by a corresponding movement of the other handlebar. A locking mechanism holds the handlebars in each of its two positions and is releasable by the rider to allow movements from one position to the other.

Each handlebar 20 has a lengthwise depression 20*d* (see FIGS. 4 and 5) that faces generally upwardly and is contoured to comfortably support the forearm of a rider when the handle bar is in the aero position (FIGS. 1 and 3). The opposite face (the underside) of each handlebar 20 is aerodynamically shaped to deflect air somewhat outwardly and downwardly away from the rider's torso when the handlebars are in the aero positions.

Figure 6:
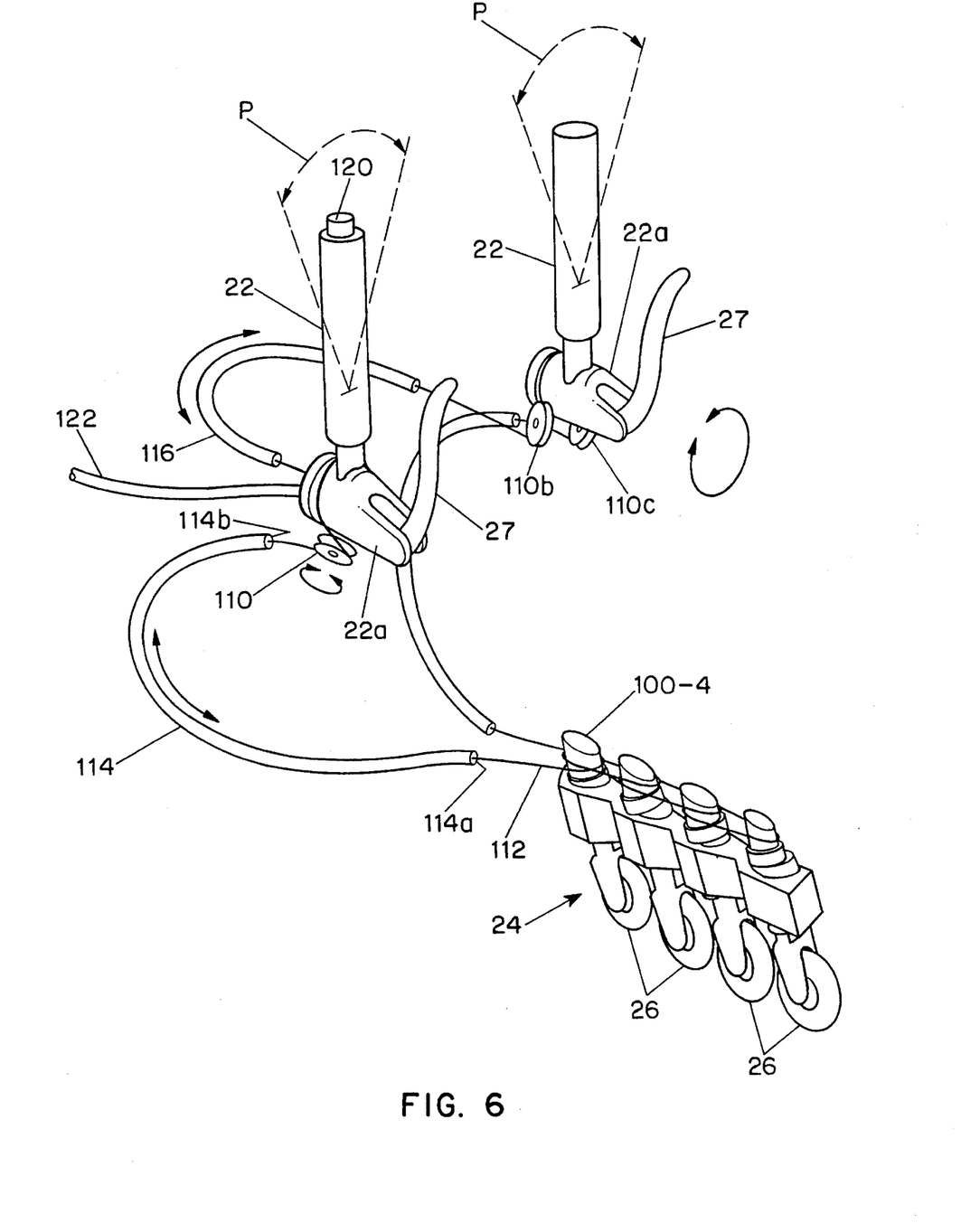
FIG. 6 is a diagrammatic view that shows the coupling between the joysticks of the handlebars and the small-wheel truck of the bicycle of FIGS. 1 to 5.

Each of the wheels of the small-wheel truck has a steering drum 100 that is rotatable in a socket in an elongated frame bar 38. The steering drums 100 are interconnected for differential steering. Any one of the wheels can be made a master and steered by a suitable coupling to the steering handles 22, pulleys and a cable being suitable. An endless cable path interconnecting the joysticks and one of the steering drums 100-4 is shown in FIG. 6. Each handlebar pivotally carries a joystick base portion 22*a* and a pair of small pulleys 110. One end of a cable 112 is affixed to the master steering drum 100-4. The cable leads from the drum through a sheath 114, which is fastened at one end 114*a* to the frame boot at a position near the drum and at the other end 114*b* to the right handlebar at a position near one pulley 110. The path of the cable 112 continues as follows: over one pulley 100*a* for the right joystick; around the base portion 22*a* of the right joystick 22; around the other pulley (not visible) paired with the pulley 100*a* for the right joystick;

through a sheath 116, the ends of which are affixed to the respective right and left handlebars; around a pulley 110b, over the base portion 22a of the left joystick, and around the pulley 110c; though a sheath 118 that extends between a fixed point on the left handlebar and the boot of the frame; and back to the drum 110-4, to which the other cable end is affixed.

The cable path allows the handlebars to be set to the standard and aero positions, the sheaths constraining the cable 112 between fixed points on the handles that are movable relative to one another when the handlebars are moved between the standard and aero positions. Pivoting of either joystick 22 (arrowed lines P) produces coordinated pivoting of the other joystick and rotation of the master steering drum 100-4. The respective wheels are steered individually and in the established differential relationship, as described in the copending application referred to above. The right joystick 22 carries a pushbutton 120 that is coupled by a control wire 122 that passes through the handlebar to a lock mechanism, as described below.

Figure 7:
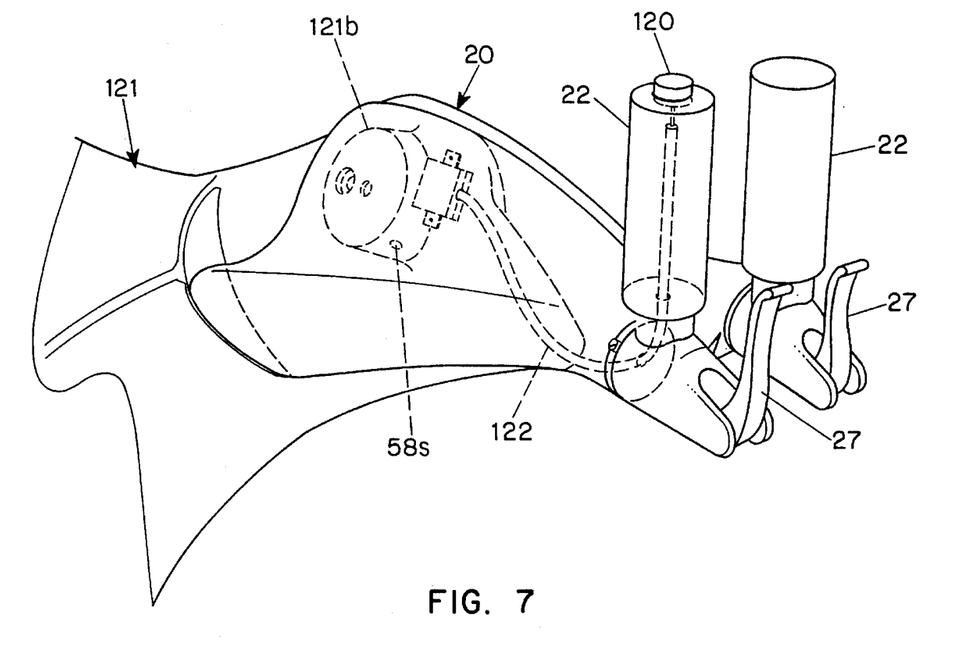
FIG. 7 is a diagrammatic detail view of the handlebars, showing a locking mechanism for maintaining the handlebars in the selected position, the aero position being shown.
Figure 8:
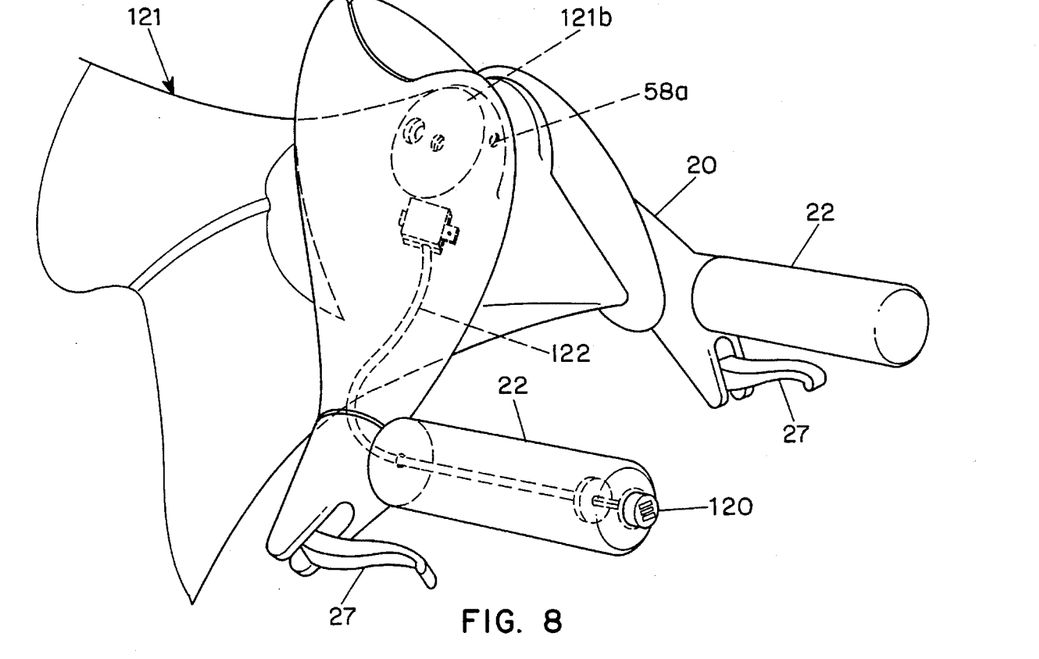
FIG. 8 is a view similar to FIG. 7, showing the standard position.
Figure 9:
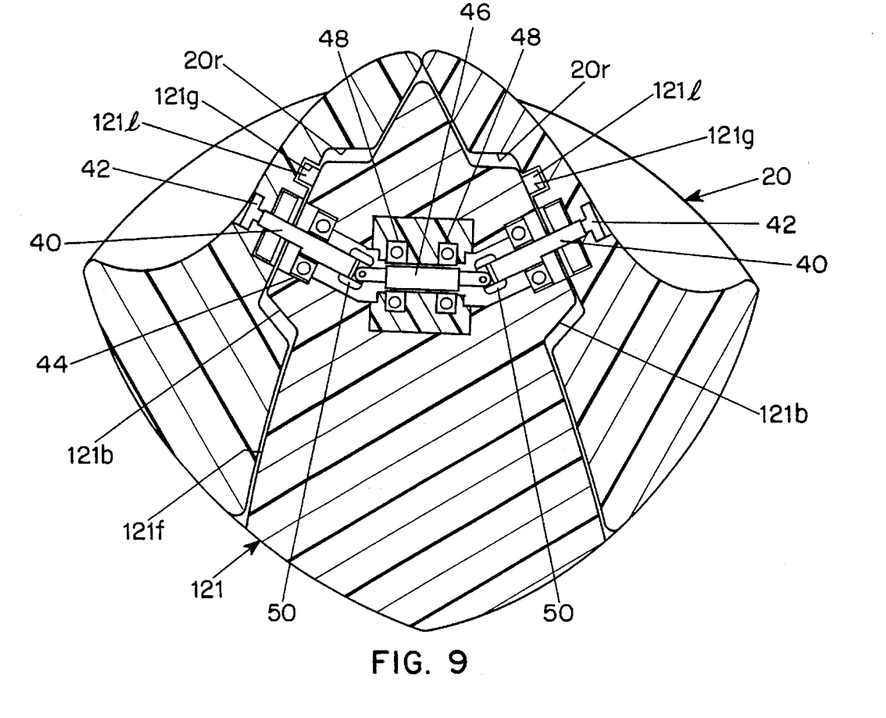
FIG. 9 is a front cross-sectional view taken transversely to the mounting member and handlebars at the mounting positions of the handlebars.

Referring next to FIGS. 7 to 9, each handlebar 20 is attached to one of the faces 121f of a mounting member, which in the embodiment of FIGS. 1 to 5 is a portion of the frame, so that it can swing upwardly and forwardly to the aero position (FIG. 7) and downwardly and outwardly to the standard position (FIG. 8). A mounting boss 121b projects from the face 121f and is received loosely in a matching recess 20r in the handlebar 20. A lug 121l on the boss 121b extends into an elongated groove 121g in the recess to provide stops at the aero and standard positions. Each handlebar is attached by a screw 42 to a shaft 40 that is rotatably received by a bearing 44. A connecting shaft 46 journaled in bearings 48 in the mounting member 121 is connected by a universal joint 50 to each of the shafts 40, so that rotational movement of each handlebar is matched by a corresponding rotational movement of the other handlebar.

Figure 7A:
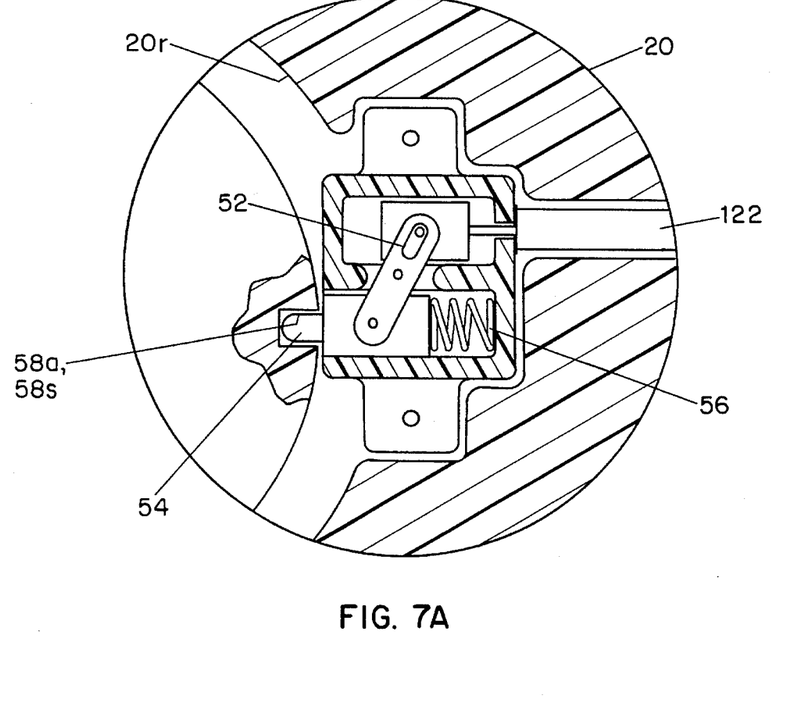
FIG. 7A is a detail view of the stop and lock mechanisms for the handlebars.

A spring-loaded rocking arm 52 (FIG. 7A) is mounted in a pocket that opens at the recess 20r in the right handlebar 20. A pin 54 on the arm is normally biased by a spring 56 into one of two receiving holes 58a and 58s in the boss 121b to lock the handlebar in one of its two positions. The sheathed control wire 122 coupled to the pushbutton 120 is fastened to the arm and rocks the arm 52 against the bias of the spring 56 when the pushbutton is pushed by the rider, thereby releasing the pin from the hole and permitting the rider to swing the handlebars into the other position. When the handlebars reach the other position and are stopped by the stop lug, the spring 56 pushes the pin 54 into the hole 58a or 58s at that position.

Figure 10:
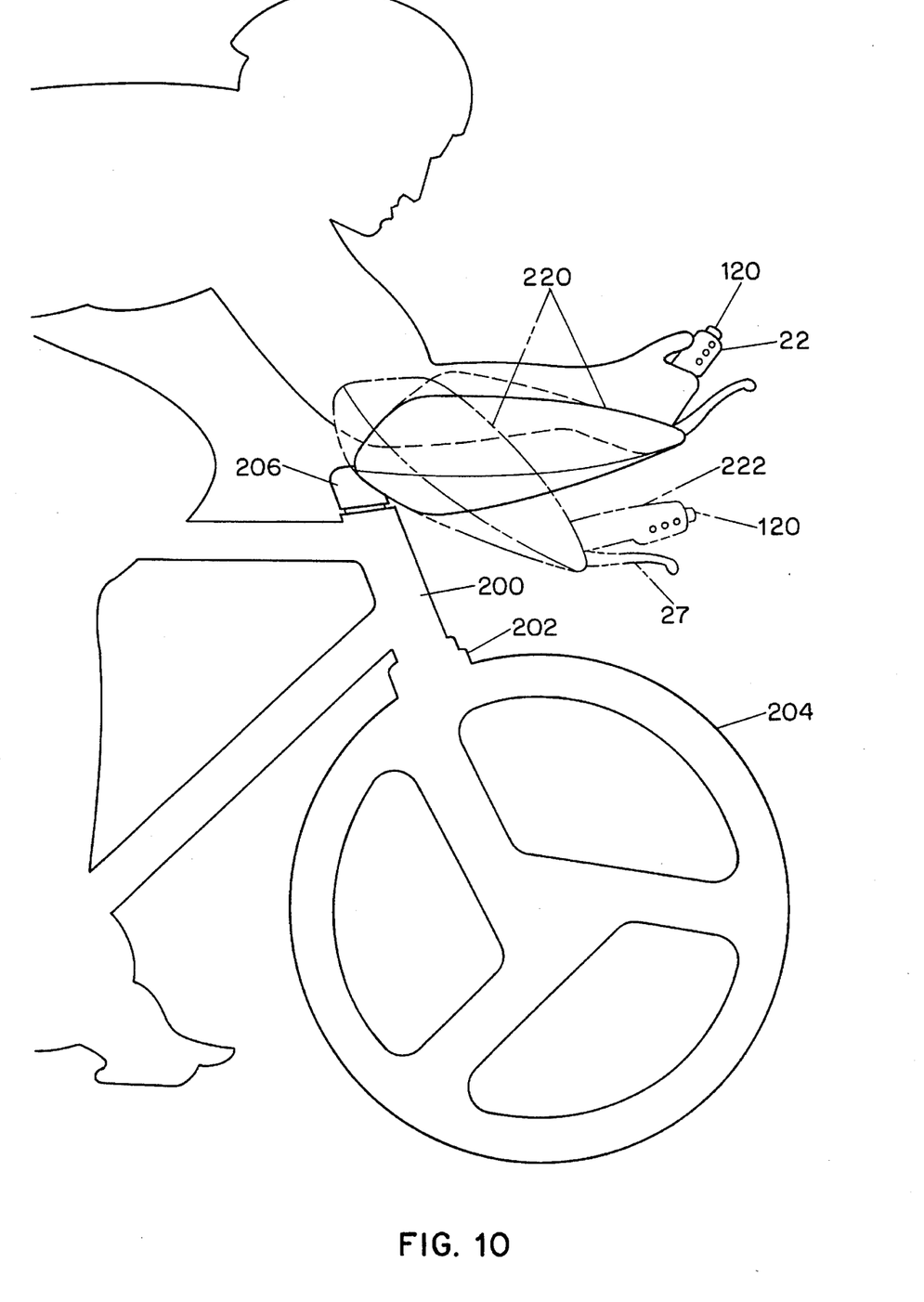
FIG. 10 is a schematic side-elevational view of handlebars according to the invention as used in a standard bicycle.

The handlebars of the present invention can be used on a standard bicycle, as shown in FIG. 10. As is well-known, a head tube 200 of the frame receives the steering tube (not visible) of a front fork 202 on which the front, steerable wheel 204 of the bicycle is mounted. A mounting member 206, of which only the rear portion is visible and on which handlebars 220 are mounted, is attached to a handlebar post (not visible), which is received in the steering tube. The handlebars 220 (shown in the aero and standard positions in FIG. 10) have fixed grips 222 and carry brake levers. The configurations of the mounting member and handlebars may be the same as those of the embodiment of FIGS. 7 to 9, and the same mechanisms can be used for mounting the handlebars and locking them in the two positions. The front wheel is, of course, steered by turning the handlebars.

The mounting member and handlebars may be monocoques of fiber-resin materials or from stamped aluminum plate, each with suitable inserts for the bearings and other mechanisms. Various mechanisms for locking and coupling the handlebars can be used in place of those of the embodiments. For example, the handlebars can be coupled by gears. Although the mounting member and handlebars shown in the drawings have been given aerodynamic shapes, which is preferred, that is not an essential characteristic.

We claim:

1. Adjustable bicycle handlebars comprising a mounting member adapted to be attached to a bicycle, a right handlebar having a handgrip portion, a left handlebar having a handgrip portion, means mounting the right handlebar on the mounting member for swinging movement in its entirety relative to the mounting member solely about a single pivot axis extending laterally to the right and obliquely forwardly and upwardly with respect to a longitudinal center plane of the bicycle for movement between a standard position and an aero position, means mounting the left handlebar on the mounting member for swinging movement in its entirety relative to the mounting member solely about a single pivot axis extending substantially laterally to the left and obliquely forwardly and upwardly with respect to the longitudinal center plane of the bicycle for movement between a standard position and an aero position, the handgrip portions of the handlebars when in the standard positions being below and laterally and forwardly of the mounting member and when in the standard positions being more widely spaced apart, lower and more rearwardly than when in the aero positions and the handgrip portions of the handlebars being swung upwardly, forwardly and inwardly when moved from the standard positions to the aero positions, and means coupling the right and the left handlebars for coordinated swinging movement between the standard and the aero positions so that when either one of the handlebars is moved between the standard and the aero positions the other handlebar moves with it.

2. Adjustable bicycle handlebars according to claim 1 wherein the coupling means includes a universal joint associated with each of the handlebars.

3. Adjustable bicycle handlebars according to claim 1 wherein the coupling means includes a connecting shaft rotatably mounted in the mounting member and a universal joint coupling each of the handlebars to the connecting shaft.

4. Adjustable bicycle handlebars according to claim 1 wherein each handlebar has an armrest portion adapted to support a portion of the forearm of a rider when the handlebar is in the aero position.

5. Adjustable bicycle handlebars according to claim 1 and further comprising a brake lever mounted on each of the handlebars.

6. Adjustable bicycle handlebars according to claim 1 and further comprising means for locking at least one of the handlebars in each of the standard and aero positions.

7. Adjustable bicycle handlebars according to claim 6 wherein the locking means is releasible by releasing means located proximate to the handgrip portion of one of the handlebars.

8. Adjustable bicycle handlebars according to claim 1 wherein each of the handlebars includes a support member and a joystick mounted for pivotal movement generally from side to side on the support member, wherein the mounting member is adapted to be affixed to a frame of a bicycle, and wherein the joystick is adapted to be coupled to a steerable wheel of the bicycle.

9. Adjustable bicycle handlebars according to claim 8 and further comprising a brake lever mounted on each of the handlebars.

10. Adjustable bicycle handlebars according to claim 9 wherein each of the brake levers is mounted on the joystick and pivots with the joystick relative to the support member.

11. Adjustable bicycle handlebars according to claim 9 wherein each of the joysticks is mounted on the support member such that it extends generally vertically when the handlebar is in the aero position and generally forwardly when the handlebar is in the standard position.

12. Adjustable bicycle handlebars according to claim 1 wherein each of the handlebars has an elongated body portion adjacent the mounting member, the handgrip portion of each of the handlebars is remote from the mounting member, and the handgrip portion of each of the handlebars extends generally vertically when the handlebar is in the aero position and extends generally forwardly when the handlebar is in the standard position.

13. Adjustable bicycle handlebars according to claim 12 and further comprising a brake lever mounted on each of the handlebars adjacent the handgrip portion.

14. Adjustable bicycle handlebars according to claim 12 wherein the body portion of each of the handlebars has an armrest portion that extends substantially along the entirety of the body portion and has a laterally concave surface that faces generally upwardly when the handlebar is in the aero position.

* * * * *